Nov. 5, 1963 R. H. STEIDL 3,109,614
FIN-TIP MOUNTED HORIZONTAL CONTROL
SURFACE FOR AIRPLANES
Filed Oct. 23, 1961 3 Sheets-Sheet 1

INVENTOR.
ROBERT H. STEIDL
BY
Reynolds & Christensen
ATTORNEYS

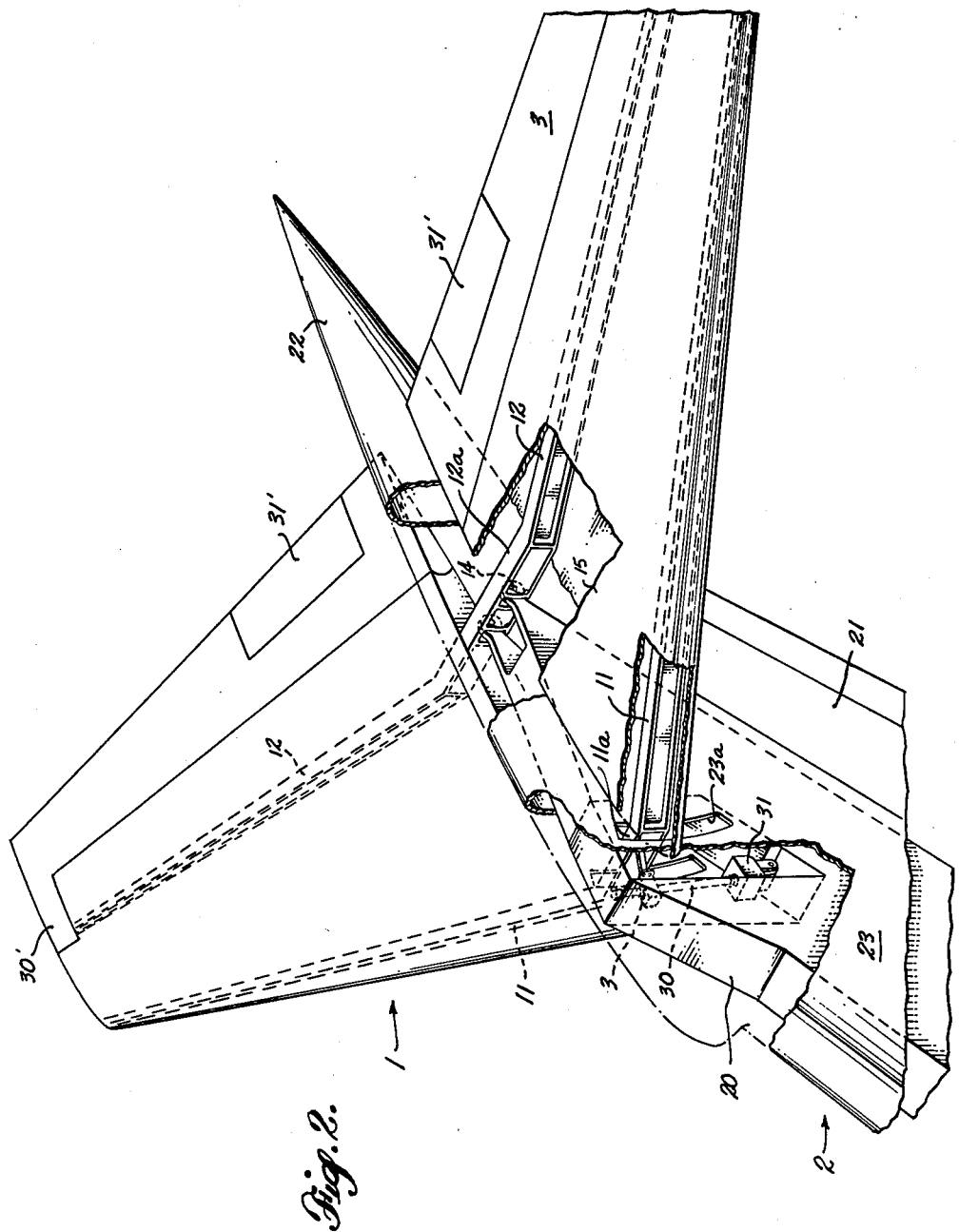

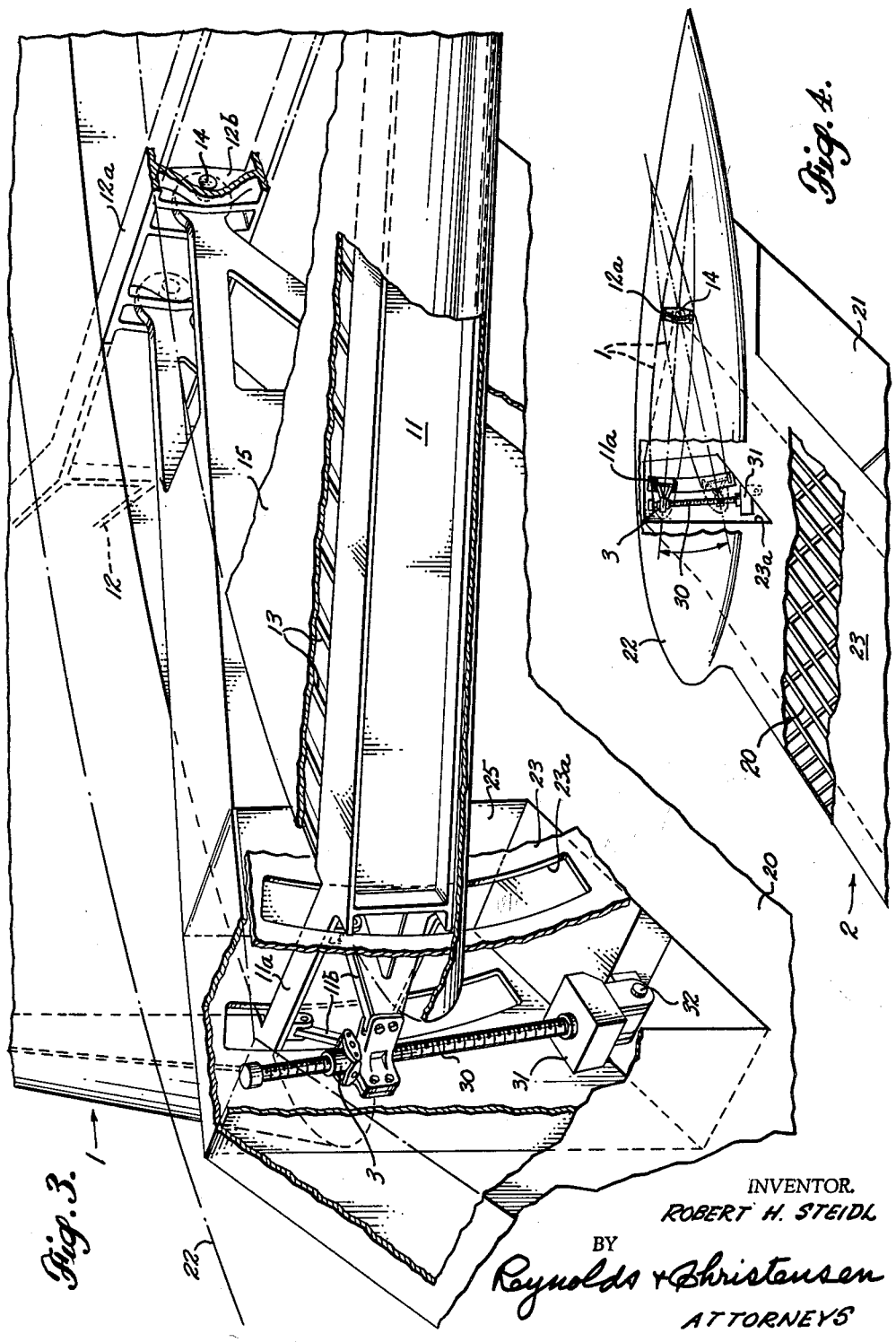

United States Patent Office 3,109,614
Patented Nov. 5, 1963

3,109,614
FIN-TIP MOUNTED HORIZONTAL CONTROL
SURFACE FOR AIRPLANES
Robert H. Steidl, Seattle, Wash., assignor to The Boeing
Company, Seattle, Wash., a corporation of Delaware
Filed Oct. 23, 1961, Ser. No. 147,003
9 Claims. (Cl. 244—87)

Certain jet-propelled aircraft mount the engines at the tail of the fuselage, sometimes two at respectively opposite sides, and sometimes three, two as just described and the third mounted within the fuselage, with a forwardly facing air intake located, for example, at the base of the fixed vertical fin, and with its jet nozzle directed rearwardly at the tip of the fuselage and the engine proper buried substantially along the longitudinal axis of the fuselage. Such a design presents empennage problems, since all control surfaces at the tail must be clear of any jet discharge, and each clear of the locus of the other. The horizontal stabilizer is therefore mounted at the upper tip of the vertical fin, to form what has been called a T-tail. If the stabilizer were not so mounted, but instead were to be mounted at the base of the fin, complications might arise due to interference between air intake or jet nozzle blasts and the air flowing over the stabilizer. If the stabilizer were to be mounted midway up the fin, mutual interference between horizontal and vertical control surfaces would be likely.

The fin-tip mounting for the horizontal stabilizer is therefore preferable, insofar as concerns these particular problems, but this involves further problems. This is particularly true when, in order to enable take-off from or landing at short airfields, or from fields at high altitudes, the stabilizer itself must be hingedly mounted in order to partake of the movements necessary for adequate control—in other words, when entire reliance for control of vertical movement of the aircraft under all circumstances can not be placed upon the elevator surfaces and their movement about a transverse horizontal axis relative to the stabilizer, but in addition the stabilizer must itself move about such a horizontal axis to supplement control movement of the elevators, or to insure that the elevators always have a safe margin of control movement.

The problems last mentioned include the provision of a sufficiently rigid fin structure that despite the long moment arm by which the horizontal stabilizer and its elevators apply control forces to the airplane fuselage, and despite the additional forces applied by the rudder mounted upon the fin, the fin is of adequate strength and rigidity, to preclude the possibility of flutter. This is of especial importance when the third engine is used, and its air intake duct passes through the base of the fin, for then the mounting of the fin upon the fuselage must be of great rigidity, despite the passage of the duct through the fin's base.

When the stabilizer is so movable its pivotal connection with the fin must be as direct as possible. A center section torque box such as has been used heretofore for attachment of outboard stabilizers with terminal fittings on the fin, involves danger of flutter, besides requiring more space and weight than is desirable. By this invention the pivotal interconnection is directly between a spar of the stabilizer and spar structure of the fin and involves no looseness such as could cause flutter.

The present invention mounts the stabilizer at the tip of the fin in such manner that the stabilizer may pivot about a transverse horizontal pivot axis, one part whereof is formed, in the form illustrated, as an integral part of a spar—normally the rear one—of the stabilizer, and directly engages an integral part of the fin's spar structure, which latter is thoroughly rigid with the fuselage structure, although spaced above the latter. Pivotal movement of the stabilizer is effected by actuator means interconnecting quite directly another spar—normally the forward one—of the stabilizer and the spar structure of the fin. Both spars of the stabilizer penetrate the tip of the fin and its spar structure, and extend uninterruptedly substantially from tip to tip of the stabilizer. Sufficient apertures are left in the fin's spar structure for admission and securement of the pivot mount, and for connection of the actuator means and arcuate movement of the stabilizer's forward spar. The pivot mount is preferably located at the center of pressure of the stabilizer. While the one-piece stabilizer spars extend uninterruptedly through the tip of the fin, and the latter's spar structure, the skin of the fin is interrupted only at the apertures mentioned, and while the skin of the stabilizer is interrupted where it spans the fin's tip, the spars are continuous, and are joined in their outboard portions by structure which makes the stabilizer a rigid whole, and the stabilizer's skin is continuous at each side of the fin.

The construction is such as to minimize weight and space requirements, to avoid flutter or distortion of either the fin or the stabilizer, to minimize openings in the fin, to insure utmost rigidity in the pivot mount, with a minimum likelihood of looseness, to enable a highly favorable location of the stabilizer, and to afford easy access for assembly or disassembly when necessary. Other objects will appear more fully hereinafter.

FIGURE 2 is a view similar to FIGURE 1, to a larger scale, and partly broken away to show interior structure of the fin and stabilizer.

FIGURE 3 is a similar but further enlarged view illustrating in some detail the relationship between the fin's spar structure and the spars of the stabilizer.

FIGURE 4 is a side elevational view, to a smaller scale, and with the near side of the stabilizer omitted, showing the interconnection between the stabilizer and the fin, the range of movement of the stabilizer, and a part of the fin's spar structure.

Figure 1:
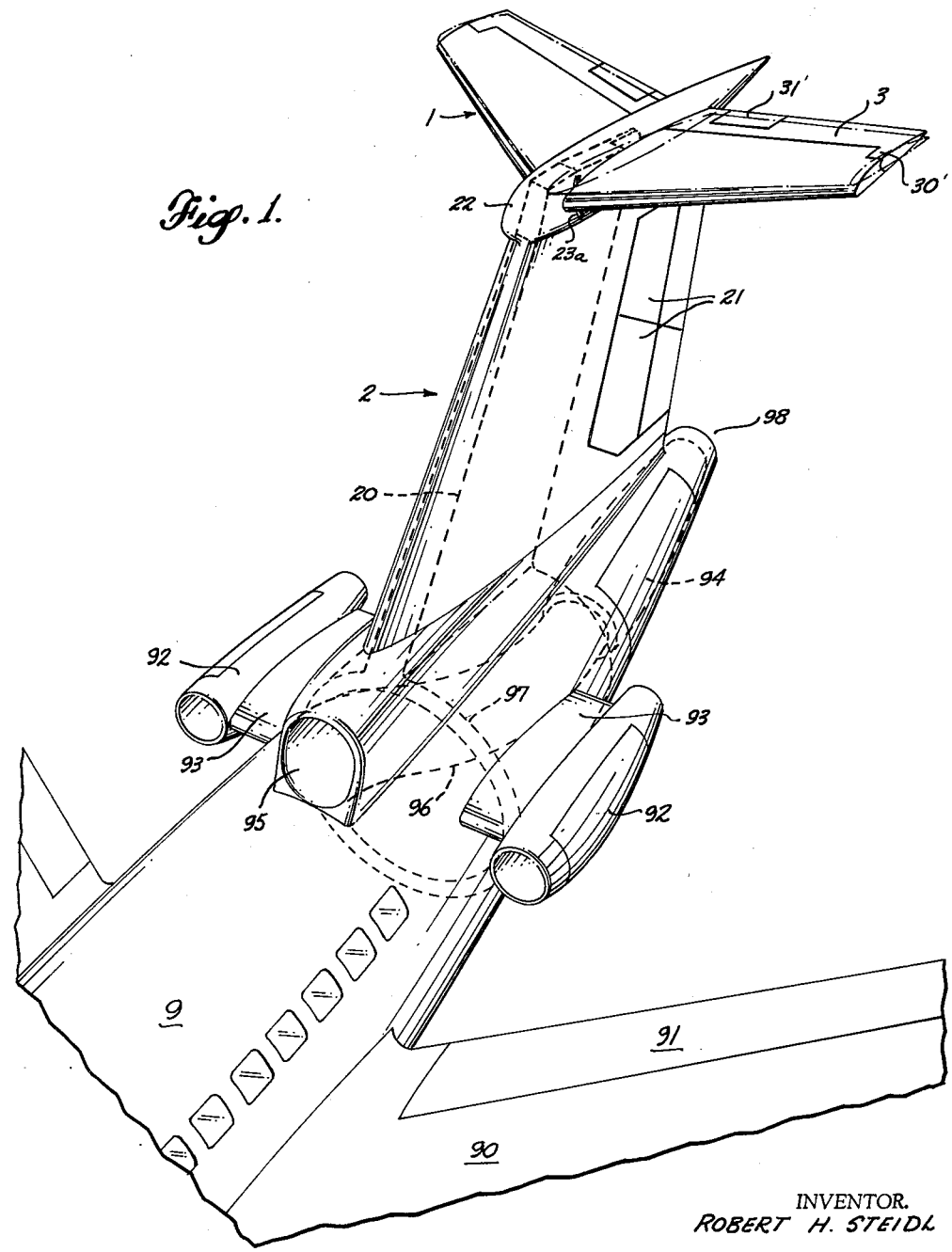
FIGURE 1 is a general isometric view of the tail end of an airplane, incorporating this invention.

The airplane chosen to illustrate the invention includes a fuselage 9 with the usual rigid framing (not shown), and wings 90 with their ailerons 91. Jet engines 92 are mounted at the tail of the fuselage, outboard upon struts 93 at the opposite sides, and a third engine 94 is buried within the fuselage, with its rearwardly directed jet nozzle 98 at the tip thereof. An air intake 95 leads by a duct 96 from a point ahead of the base of the fin downwardly and rearwardly to the engine 94. The arrangement affords ample space for mounting the fin securely and rigidly upon the fuselage structure, as suggested at 97, and for the air intake duct as well.

The fin 2 rises above the fuselage, and incorporates a rigid spar structure 20 which rises from and is rigid with the fuselage structure 97, at the forward edge portion of the fin. However, the spar structure 20 has quite appreciable breadth in the fore and aft direction throughout its height, so that in effect the fin has but a single spar structure, to the rear edge whereof rudders 21 are pivotally mounted. Its upper tip may be faired by a bulbous streamlined tip 22. The interior structure of the fin is otherwise enclosed by skins 23 (FIGURE 4).

The horizontal stabilizer 1 includes a forward spar 11 and a rear spar 12 which are continuous, being preferably integral substantially from tip to tip. The leading edge may be swept back, in which case the spars—certainly the forward spar 11 and normally to some degree the rear spar 12—are inclined rearwardly at the opposite sides of center sections 11a and 12a. The two spars, outside the center sections, are joined by suitably designed ribs and stringers generally indicated at 13 in FIGURE 3, but omitted in other figures for greater clarity, which resist torsional and other forces and maintain the stabilizer rigid. Skins 15 assist in this, and cover the interior structure outboard of the fin 2.

The center section 12a of the rear spar 12 is preferably located in the vicinity of the stabilizer's center of pressure, and is formed integrally with one part of a pivot mounting, at 12b. The skin 23 of the fin is apertured, and the upper rear part of the spar structure 20 is formed complementally to the pivot mounting 12b, whereby through pivot pins 14 the stabilizer 1 can be mounted directly upon the fin's rigid spar structure 20. The fin's skin 23 is apertured at 23a, arcuately about the pivot axis at 14, for through passage and movement of the stabilizer's forward spar center section 11a, and the fin's spar structure is apertured at 25, for like purposes, and for mounting and connection of actuator mechanism for tilting the stabilizer. For example, A-frames 11b mounted upon center section 11a support a nut 3 threaded upon a screw 30 which is rotatively journaled within a box 31, the latter being pivotally mounted at 32 to the spar structure 20. By rotating the screw 30 in one sense or the other the A-frame 11b and the front spar to which the latter are secured is elevated or depressed, and the horizontal stabilizer 1 is tilted bodily about the pivot axis at 14.

Normal control movement of elevators 3 which are pivoted along the usual transverse horizontal hinge axes (not shown) relative to the horizontal surface 1 is effected by the usual actuators (not shown), which can be mounted upon the stabilizer 1 itself, and by assisting tabs and horns, as suggested at 31′ and 30′. For in-flight control these elevators 3 will afford sufficient surface area, for the most part. During take-off and landing these elevators may afford insufficient area, or may require to be moved so far towards the limit of their movement as to leave no excess of movement for further, unexpected control movement, when needed. At such times the stabilizer 1 is moved, before the limit of elevator movement is reached, and thereby there is always ample range of elevator movement, and ample surface area for meeting even unexpected requirements.

The vertical fin is a continuous rigid structure, and the continuous rigid structure of the horizontal stabilizer intersects and straddles the fin structure. The fin's spar structure is not materially weakened at 14 and at 25 where the spars of the stabilizer protrude through it. Since the pivot axis at 14 is not supported outboard of the fin's spar structure, but within the latter, as is also the point of reaction of control forces at 32, there is no great tendency to bend the spar structure, the rigidity whereof maintains the stabilizer always rigid with the spar, although movable relative thereto. Flutter is effectively prevented by this arrangement, and by the close pivotal connection between the spar structure 20 and the rear spar 12 at 12b, which precludes looseness. Assembly or disassembly is facilitated, since the tip 22, or parts thereof, are readily removable to allow entry or removal of central sections 11a and 12a from their respective apertures, and connection or disconnection of the screw 30.

The stabilizer moves with respect to the bulbous tip 22, and the aperture 23a in the latter is at most times largely covered, hence creates no great drag.

I claim as my invention:

1. An aircraft including a fuselage structure and a vertical tail fin incorporating a rigid spar structure rigid with and rising from the fuselage structure, and of a breadth from its leading edge rearwardly approximating the breadth of the fin, said fin also including a skin overlying said spar structure, a horizontal control surface including a forward spar and a rear spar each extending from tip to tip of the horizontal control surface, the fin's skin being apertured adjacent its upper end for penetration of the rear spar of the horizontal control surface, and the fin's skin and spar structure being arcuately apertured, also adjacent the fin's upper end, for penetration and arcuate movement of the forward spar of the horizontal control surface, pivot means within the fin defining a horizontal pivot axis, and interconnecting the spar structure of the fin and the rear spar of the horizontal control surface, means within the fin interconnecting the spar structure of the fin and the forward spar of the horizontal control surface, for pivotally adjusting said surface about its horizontal pivot axis, said horizontal control surface having a skin overlying its forward and rear spars, and extending inwardly from its tips to but not through the skin of the fin.

2. An aircraft as in claim 1, wherein the fin's skin includes a bulbous streamlined tip directed forwardly and rearwardly, the horizontal control surface projecting laterally at each side of said tip, and the tip being apertured for passage and movement of the spars of the horizontal control surface.

3. The combination defined in claim 1, including a vertical rudder pivotally mounted upon the rear edge of the fin's spar structure to swing to either side of the fin for directional control, and located wholly beneath the locus of the rear edge of the horizontal control surface.

4. The combination defined in claim 1, including also an elevator surface pivotally mounted on a horizontal axis at the rear edge of the horizontal control surface, and pivotally movable relative to the horizontal control surface, for vertical control.

5. In combination with an airplane fuselage, a vertical's fin rising from the tail portion of said fuselage, and including a spar structure rigid with the fuselage and of appreciable breadth throughout from its front edge to its rear edge, jet engines fixedly mounted upon the tail portion of the fuselage, and discharging rearwardly, a vertical rudder pivotally mounted along the rear edge of said spar to swing to either side of the fin for directional control, and located above said engines, clear of the jet streams from the same, a horizontal control surface including uninterrupted structural elements extending through said vertical fin's spar structure, to opposite sides of the fin, a pivot mount interconnecting certain of said structural elements of the vertical fin and the horizontal control surface, intermediate the front and rear of said surface, for bodily control movements of the horizontal control surface in the vertical direction, and actuating means also interconnecting said structural elements of the vertical fin and of said horizontal control surface, at a distance from said pivot mount, to effect such control movements of the horizontal control surface.

6. The combination defined in claim 5, wherein the pivot mount is located in the vicinity of the center of pressure of the horizontal control surface.

7. The combination defined in claim 5, wherein the horizontal control surface, with the exception of the front and rear spars, is interrupted to straddle the vertical fin.

8. The combination defined in claim 5, including a movable directional control surface hingedly mounted in vertical disposition at the rear of the spar structure of the fin, and terminating at its upper end below the locus of the horizontal control surface.

9. In an aircraft, a fixed vertical fin incorporating a rigid spar structure terminating at its upper end in projecting pivot ears, and arcuately apertured about said ears as a center at a distance forwardly thereof, a horizontal control surface including front and rear spars continuous from tip to tip, the rear spar being apertured from front to rear for reception of said pivot ears, pivot pins interengaging said pivot ears and the rear spar, an A-frame projecting forwardly from the center section of the forward spar, within the fin's spar structure, and an actuator interconnecting the fin's spar structure and said A-frame, for bodily movement of the horizontal control surface about said pivot pins, and arcuate movement of the front spar in the corresponding aperture of the fin's spar structure.

References Cited in the file of this patent
UNITED STATES PATENTS

| | | |
|---|---|---|
| 1,645,928 | Potez | Oct. 18, 1927 |
| 2,152,981 | Taylor | Apr. 4, 1939 |
| 2,941,754 | Bouffort | June 21, 1960 |
| 2,981,504 | Parker | Apr. 25, 1961 |